Figures 1, 2:
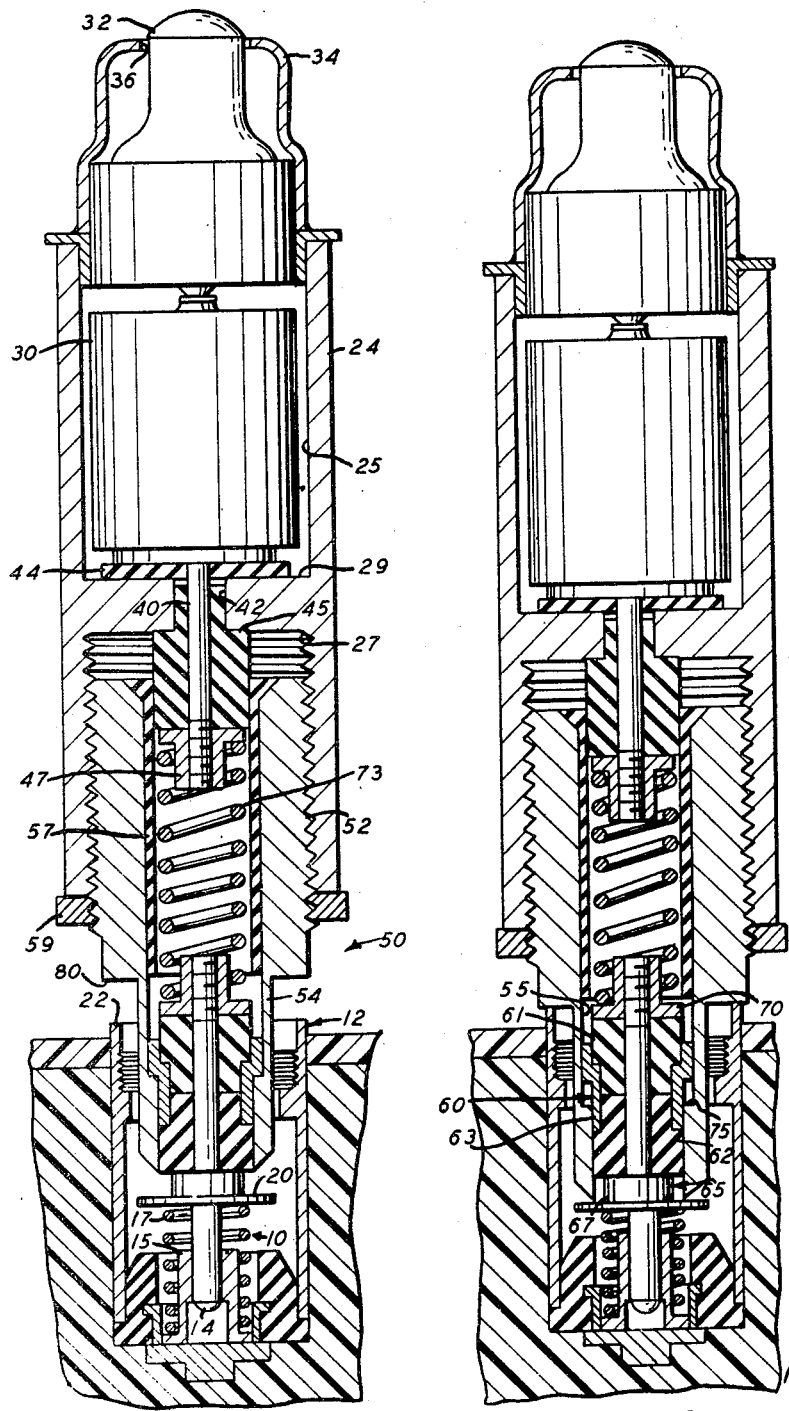

March 2, 1954  H. N. AVILES  2,671,210
APPARATUS FOR TESTING SPRINGS
Filed Nov. 28, 1951

INVENTOR
H. N. AVILES
BY
ATTORNEY

Patented Mar. 2, 1954

2,671,210

UNITED STATES PATENT OFFICE 2,671,210

APPARATUS FOR TESTING SPRINGS

Harvey N. Aviles, Towson, Md., assignor to Western Electric Company, Incorporated, New York, N. Y., a corporation of New York Application November 28, 1951, Serial No. 258,677

5 Claims. (Cl. 340—265)

This invention pertains to testing devices, and more particularly to gauges for testing springs.

In the manufacture of certain types of electrical equipment, it is sometimes desirable to measure the resilient force exerted by a spring-biased electrical contact when compressed a certain amount. Heretofore, great difficulty has been encountered in testing spring-biased contacts mounted within depressions in the equipment. Due to their relative inaccessibility, it has been found that standard testing devices were not adapted for economical and rapid tests of spring-biased contacts mounted in the aforementioned manner.

It is an object of this invention to provide new and improved testing devices.

It is another object of this invention to provide new and improved gauges for testing springs.

Other objects and features of this invention will become apparent as the specification proceeds.

A gauge illustrating certain features of this invention may include a casing, a source of electromotive force, and an electric signaling device positioned in one end of the casing. One contact of the signaling device is connected to one of the terminals of the electromotive force. A probe is slidably mounted within the other end of the casing and is biased by resilient means to a position wherein an end portion of the probe protrudes beyond the adjacent end of the casing. When the guage engages a spring-biased contact of sufficient resilient strength to depress the probe a predetermined amount, the signaling device is energized by means electrically connecting the other contact of the signaling device to the other terminal of the source of electromotive force.

A better understanding of the invention will be had by reference to the following description when considered in conjunction with the accompanying drawing, in which:

Fig. 1 is a longitudinal section view of the device and a protector well showing the device being inserted in the well, and Fig. 2 is a similar view of the device and a protector well showing the device inserted within the well to its full depth.

The spring-testing gauge illustrated in Fig. 1 is designed to test a spring-biased contact 10, which is mounted on the bottom of a fuse well 12. The contact 10 comprises a flanged contactor 14, slidably mounted within a bushing 15 secured to the bottom of the fuse well 12, and a compression spring 17. The contactor 14 is resiliently supported by the spring 17, which engages the undersurface of a flanged head 20 on the contactor 14. In use, the flanged head 20 must exert a resilient force greater than a predetermined minimum value when it has been depressed to a position wherein the top surface of the head 20 is at a predetermined distance from a lip 22 of the fuse well 12.

The spring-testing gauge includes an outer tubular casing 24, which is made of a conducting material. The interior of the casing 24 is separated into an upper and lower chamber 25 and 27 by a partition 29 formed integrally with the casing 24. The upper chamber 25 is designed to receive a dry cell 30 and an electric lamp 32.

A flanged guard cap 34 of conducting material, having an aperture 36 formed in its closed end, fits partially within the chamber 25 and encloses the lamp 32, except for a small portion of the lamp which protrudes through the aperture 36. The cap 34 normally retains the positive terminal of the lamp 32 in position against the anode of the dry cell 30, but may be removed, if necessary, to replace the lamp or the dry cell. When the cap 34 is in place, the flanged portion thereof rests against the upper end of the casing 24, and the lower annular portion thereof fits into the chamber 25 of the casing, effectively grounding the metallic base of the lamp 32 to the metallic wall of the chamber 25. The usual paper jacket which surrounds the dry cell 30 insulates it from the metallic wall of the chamber 25.

The exposed metallic bottom of the dry cell 30 is held in contact with the upper surface of a flanged terminal pin 40, which is made of a conducting material. The terminal pin 40 is spacedly mounted within an aperture 42 in the partition 29. An insulating washer 44 and an insulating bushing 46 space the flanged portion and the shank portion, respectively, of the pin 40, from the partition 29. A spring seat 47 threadedly mounted on shank portion of the pin 40 holds the flanged portion thereof firmly upon the insulating washer 44 and clamps the bushing 46 and the washer 44 in position within and against the partition 29.

A cylindrical gauge head 50, having an externally threaded upper portion 52 and a recessed plug 54 at the lower end, is provided with a longitudinally extending bore 55. The upper portion 52 of the gauge head 50 is threadedly received within the internally-threaded lower chamber 27, in a position such that the bushing 46 and the spring seat 47 extend into an insulating sleeve 57, which is inserted within the upper portion of the bore 55. A jam nut 59 prevents accidental rotation of the gauge head. The length of the plug 54 determines the "depressed" position of the flanged head 20 of the contactor 14 in which position the resilient force of the compression spring 17 is tested.

A plunger 60 is slidably mounted within the lower portion of the bore 55 at the lower end of the gauge head 50. The plunger 60 comprises two flanged cylinders 61 and 62 of insulating material, mounted respectively within opposite ends of a flanged metal sleeve 63. A metal probe 65, having a stem portion, one end of which has been upset to form a flanged probe head 67 and the other end being provided with threads to receive a spring seat 70, passes through drilled apertures in the cylinders 61 and 62. The spring seat 70, threadedly fastened to the end of the probe 65 serves to retain the plunger 60 as an assembled unit. The external diameter of the plunger 60 has been made substantially greater than the external diameter of the probe head 67, which is concentrically mounted therein.

A standard compression spring 73 is mounted within the insulating sleeve 57 in the bore 55. The upper and lower ends of the spring 73 are engaged by the shank portions of the spring seats 47 and 70, respectively, which are designed to retain and align the spring. The plunger 60 is normally held by the spring 73 in a position wherein the lower edge of the flanged projection on the metal sleeve 63 rests against an internal shoulder 75 of the reduced portion of the bore 55. In this position the lower surface of the plunger 60 is flush with the tapered rim of the plug 54, and the entire probe head 67 protrudes therebeyond (see Fig. 1).

If sufficient force is exerted on the lower surface of the probe head 67, the plunger 60 will slide inwardly against the force exerted by the standard spring 73. As shown in Fig. 2, a substantial amount of clearance exists between the periphery of the probe head 67 and the sides and tapered rim of the plug 54 when the plunger 60 is fully retracted (i. e. the lower surface of the probe head 67 is flush with the tapered rim). The standard spring 73 is designed to exert a predetermined force when the plunger 60 is in the fully retracted position.

Since the spring seats 47 and 70 are made of a conducting material, as is the spring 73, there is an electrical conducting path from the terminal pin 40 to the lower surface of the plunger head 67. Normally, there is an incomplete circuit between the two terminals of the electric lamp and the lamp remains unlighted. However, the circuit may be completed by bridging the plunger head 67 and the rim of the plug 54 with a conducting material, thereby lighting the lamp 32, which will then be connected in series with the dry cell 30. The completed circuit may be traced through the dry cell 30, the terminal pin 40, the spring seat 47, the spring 73, the spring seat 70, the probe 65, the conducting material bridging the plunger head 67 and the plug 54, the casing 24, the cap 34, and the lamp 32 to the anode of the dry cell.

Operation

In using the gauge described hereinabove, the plug 54 is inserted in the fuse well 12. The gauge is forced downwardly until a shoulder 80 of the upper portion 52 of the gauge head 50 is resting firmly in contact with the lip 22 of the fuse well 12. The probe head 67 contacts the flanged head 20 of the contactor 14 and initially forces it downwardly. As the compression spring 17 is depressed an increasing amount, the force that it exerts on the flanged head 20 and the probe head 62 increases. If the force exerted by the spring 17 on the flanged head 20 exceeds the force exerted upon the plunger 60 by the standard spring 73, when the shoulder 80 is in contact with the lip 22 of the fuse well 12, the plunger will slide inwardly within the bore 55 until it is fully retracted.

As previously stated, the standard spring 73 is designed to exert a known force when the plunger 60 is fully depressed. In this position the probe head 57 is flush with the tapered rim on the plug 54 and the flanged head 20 bridges the air gap separating the probe head 57 and the tapered rim on the plug 54, thereby completing the electric circuit which energizes the electric lamp 32. Energization of the electric lamp 32 indicates to the operator the fact that the spring-biased contact 10 is acceptable, that is, it exerts a resilient force greater than a predetermined minimum value when it has been depressed to a position wherein the flanged head 20 is at a predetermined distance from the lip 22 of the fuse well 12.

However, if the resilient force exerted by the spring-biased contact 10 is less than the required minimum value, the electric lamp 32 remains unlighted. This is due to the fact that the force exerted by the standard spring 73 is greater than the resilient force of the contact 10 and will not allow the plunger 60 to assume its fully retracted position. This makes it impossible for the flanged head 20 of the contactor 14 to bridge the air gap between the probe head 67 and the tapered rim on the plug 54.

Adjustments in the predetermined force exerted by the standard spring 73 may be made by backing off the jam nut 59 and rotating the gauge head 50 so as to change the relative positions of the head 50 and the casing 24. In this manner the length of the spring 73 may be altered, thereby effecting changes in the resilient force exerted by the spring. It is apparent that the gauge must be recalibrated after the aforementioned changes have been made.

It is manifest that the device herein described is only one embodiment of the invention, and that various modifications may be made within the spirit and scope of the invention.

What is claimed is:

1. A gauge for testing the resilient force exerted by spring-biased contacts mounted in depressions in electrical equipment, which comprises a tubular casing of conducting material, a dry cell mounted within the casing and insulated therefrom, an electrical signaling device positioned in one end of the casing, said device having a contact electrically connected to the casing and another contact electrically connected to a terminal of the dry cell, a member of conducting material threadedly secured within the other end of said casing and protruding therefrom, said member being provided with a longitudinally extending bore, a recessed plug provided on unthreaded end of the member, said plug having an external shoulder for gauging the depth of penetration of the plug when inserted within a depression, a plunger of insulating material slidably mounted within the bore, said plunger having a longitudinally extending aperture provided therein, a probe of conducting material fixedly mounted within the aperture and having an end portion which depends from the outer end of the plunger, resilient means normally urging the plunger to a position wherein the outer end of the plunger is substantially flush with the adjacent end of the plug, with the depending portion of the probe protruding therebeyond, and means electrically connecting the probe to the other terminal of the dry cell, whereby when the gauge engages a spring-biased contact of sufficient resilient strength, the probe is retracted a predetermined amount and the end of the probe and the adjacent end of the plug are bridged by the contact, thereby causing the signaling device to be energized.

2. A gauge for testing the resilient force exerted by spring-biased contacts mounted in depressions in electrical equipment, which comprises a tubular casing of conducting material, a dry cell mounted within the casing and insulated therefrom, an electrical signaling device positioned in one end of the casing, said device having a contact electrically connected to the casing and another contact electrically connected to a terminal of the dry cell, a member of conducting material threadedly secured within the other end of said casing and protruding therefrom, said member being provided with a longitudinally extending bore, a recessed plug provided on the unthreaded end of the member, said plug having an external shoulder for gauging the depth of penetration of the plug when inserted within a depression, a plunger of insulating material slidably mounted within the bore, said plunger having a centrally located, longitudinally extending aperture provided therein, a probe of conducting material fixedly mounted within the aperture and having an end portion thereof, which depends from the outer end of the plunger, resilient means normally urging the plunger to a position wherein the outer end of the plunger is substantially flush with the adjacent end of the plug, with the depending portion of the probe extending therebeyond, means for adjusting the resilient force exerted upon the plunger, and means electrically connecting the probe to the other terminal of the dry cell, whereby the signaling device is energized when the gauge engages a spring-biased contact which causes the probe to retract a predetermined amount and conductively bridges the end portion of the probe and the adjacent end of the casing.

3. A gauge for testing the resilient force exerted by spring-biased contacts, which comprises a casing of conductive material, an electric signaling device positioned within one end of the casing, a probe of conductive material slidably mounted within the other end of the casing and insulated therefrom, resilient means normally biasing the slidable probe to a position wherein an end portion thereof protrudes beyond the adjacent end of the casing, and means for energizing the signaling device when the probe engages a spring-biased electrical contact of sufficient resilient strength when depressed to cause the probe to retract a predetermined amount and bridge the end portion of the probe and the adjacent end of the casing to complete an electrical circuit.

4. A gauge for testing the resilient force exerted by a spring-biased contact mounted in a well in an article, which comprises a tubular casing of conductive material, a source of electromotive force, an electric signaling device, a gauging member of conductive material secured within one end of said casing and protruding therefrom, said member being provided with a longitudinally extending bore and having on its free end a recessed portion of a predetermined length designed to gauge the depth of penetration of said member when inserted into a well in an article, a probe of conductive material slidably mounted within the bore and insulated therefrom, resilient means normally urging the probe to a position wherein the outer end of the probe protrudes beyond the adjacent end of the gauging member, and means electrically connecting the source of electromotive force and the signaling device in a series circuit of which one terminal is electrically connected to the casing and the other terminal is electrically connected to the probe whereby when the gauge engages a spring-biased contact having sufficient resilient strength the signaling device is energized.

5. A gauge for testing the resilient force exerted by a spring-biased contact mounted in a well in an article, which comprises a tubular casing of conductive material, an electrical cell mounted in the casing, an electric bulb positioned within one end of the casing, a gauging member of conductive material threadedly secured within the other end of said casing and protruding therefrom, said member being provided with a longitudinally extending bore and having on its free end a recessed portion of a predetermined length designed to gauge the depth of penetration of said member when inserted into a well in an article, a plunger of insulating material slidably mounted with the bore and having a longitudinally extending aperture provided therein, a probe of conductive material fixedly mounted within the aperture and having an end portion which extends beyond the outer end of the plunger, resilient means normally urging the plunger to a postion wherein the outer end of the probe protrudes beyond the adjacent end of the gauging member, and means electrically connecting the cell and the bulb in a series circuit of which one terminal is electrically connected to the casing and the other terminal is electrically connected to the probe whereby when the gauge engages a spring-biased contact having sufficient resilient strength the probe is retracted so that the end of the probe and the adjacent end of the gauging member are bridged to cause the lamp to be energized.

HARVEY N. AVILES.

References Cited in the file of this patent

UNITED STATES PATENTS

| Number | Name | Date |
|---|---|---|
| 1,565,577 | McDonough | Dec. 15, 1925 |
| 2,003,910 | Stephenson | June 4, 1935 |
| 2,383,550 | Homan et al. | Aug. 28, 1945 |
| 2,472,545 | Nixon | June 7, 1949 |